(12) United States Patent
Chien

(10) Patent No.: US 7,121,682 B2
(45) Date of Patent: Oct. 17, 2006

(54) SCANNING DEVICE

(75) Inventor: Hsin-Tang Chien, Keelung (TW)

(73) Assignee: Lite-On Technology Corporation, Taipei (TW)

( * ) Notice: Subject to any disclaimer, the term of this patent is extended or adjusted under 35 U.S.C. 154(b) by 90 days.

(21) Appl. No.: 10/620,344

(22) Filed: Jul. 17, 2003

(65) Prior Publication Data

US 2004/0070968 A1 Apr. 15, 2004

(30) Foreign Application Priority Data

Oct. 9, 2002 (TW) .............................. 91216057 U

(51) Int. Cl.
*F21S 4/00* (2006.01)
(52) U.S. Cl. ...................................... 362/223; 362/260
(58) Field of Classification Search ................... 362/33, 362/97, 217, 223, 260, 297, 310, 330, 331, 362/337, 346, 348, 308, 309, 328; 313/493, 313/634, 110, 111; 358/475; 359/837
See application file for complete search history.

(56) References Cited

U.S. PATENT DOCUMENTS

| | | | | |
|---|---|---|---|---|
| 3,457,447 A | * | 7/1969 | Menelly et al. ............. 313/110 |
| 3,825,742 A | * | 7/1974 | Levin ......................... 362/296 |
| 3,885,181 A | * | 5/1975 | Nelson et al. ............... 313/110 |
| 4,021,659 A | * | 5/1977 | Wiley ......................... 362/297 |
| 4,054,793 A | * | 10/1977 | Shemitz ...................... 362/127 |
| 4,233,651 A | * | 11/1980 | Fabbri ........................... 362/33 |
| 4,503,356 A | * | 3/1985 | Kobayashi et al. .......... 313/634 |
| 4,547,813 A | * | 10/1985 | McGraw et al. ............. 358/494 |
| 4,575,788 A | * | 3/1986 | Lewin ......................... 362/346 |
| 4,891,664 A | * | 1/1990 | Kanai ........................... 355/67 |
| 5,040,104 A | * | 8/1991 | Huisingh et al. ............ 362/330 |
| 5,115,380 A | * | 5/1992 | Huisingh et al. .............. 362/33 |
| 5,189,340 A | * | 2/1993 | Ikeda .......................... 315/116 |
| 5,291,379 A | * | 3/1994 | Lu ............................... 362/255 |
| 5,343,120 A | * | 8/1994 | Mulieri ......................... 315/58 |
| 5,469,303 A | * | 11/1995 | Wun et al. ................... 359/896 |
| 5,632,547 A | * | 5/1997 | Ge et al. ....................... 362/16 |
| 5,988,836 A | * | 11/1999 | Swarens ...................... 362/364 |
| 6,550,942 B1 | * | 4/2003 | Zou et al. .................... 362/347 |
| 6,586,881 B1 | * | 7/2003 | Miyazawa et al. .......... 313/634 |
| 6,789,737 B1 | * | 9/2004 | Tien ....................... 235/462.45 |
| 2003/0090749 A1 | * | 5/2003 | Branson et al. ............. 358/509 |

FOREIGN PATENT DOCUMENTS

WO WO 99/54907 * 10/1999
WO WO 03/032363 A1 * 4/2003

* cited by examiner

*Primary Examiner*—Ali Alavi
*Assistant Examiner*—Hargobind S. Sawhney
(74) *Attorney, Agent, or Firm*—Birch, Stewart, Kolasch & Birch, LLP

(57) ABSTRACT

The present invention provides a scanning device including a lamp, an object, and a transparency (or a reflector). The present invention changes the optical path by varying the shape of tube wall of lamp, the transparency or the reflector to compensate the light in the boundary regions of the lamp. Moreover, the present invention is capable of reducing the dimension of the scanning device.

2 Claims, 7 Drawing Sheets

SCANNING DEVICE

FIELD OF INVENTION

The invention relates to a scanner and, more particularly, to a scanner that is capable of compensating the boundary regions of the lamp.

BACKGROUND OF THE INVENTION

A scanner scans pictures, texts, and photographs into graphic files.

FIG. 1A is a partially schematic diagram of a conventional scanner. As shown in

FIG. 1A, a conventional scanner includes a lamp 101 and an object 103 to be scanned. The lamp 101 emits a light beam toward the object 103. Specifically, the intensity of the light beam received by the object 103 must reach a certain level so that the object (e.g. a picture or a text) can be precisely converted into a graphic file. However, the light beam from the areas at two sides of the lamp is not very strong due to the physical constraint of the lamp 101 itself; therefore, the designer of the scanner has to employ a light tube that its length is longer than the widest width of the object to be scanned.

Also, referring to FIG. 1B, a conventional scanner includes a lamp 101, an object to be scanned 103, and a reflector 105. The reflector 105 is located above the lamp 101. When the lamp 101 emits a light beam, the object 103 will receive a direct light beam from the lamp 101 as well as a reflected light beam from the reflector 105.

In addition, as shown in FIG. 1C, the reflector 105 is a parabolic surface, and the lamp 101 is placed on the focus of the reflector 105. When the reflector 105 reflects the light beam emitted by the lamp 101, according to the property of the light beam, the reflected light beam will be emitted downwardly in parallel toward the object 103 so that the intensity of the light beam received by the object 103 can be intensified to increase the work performance of the scanner. However, the light beam at two sides of the light tube is insufficient due to the physical constraint of the lamp 101.

On the other hand, designing a slimmer and smaller apparatus has been a trend pursued by designers. However, the light beam in the boundary regions of the light tube hampers the space utilization of a scanner. For instance, in an A4 scanner, the length of its light tube is generally longer than the widest width of the object to be scanned in about 3 to 4 centimeters, which in turn makes it impossible for the dimension of the scanner to be diminished. Therefore, it is imperative to have a device that compensates the light intensity in the boundary regions of the lamp so as to reduce the dimension of the scanner.

SUMMARY OF THE INVENTION

The main and first object of the invention is to provide a scanning device to solve the aforementioned problem. The scanning device includes a lamp, an object to be scanned, and a reflector. The reflector is placed between the lamp and the object, while the surface of the reflector facing the object contains a plurality of refractors so as to refract the light beam emitted by the lamp.

The second object of the invention is to provide a scanning device, which includes a lamp and an object to be scanned. The lamp is a light tube of variable thickness having two ends and a central part, the thickness at two ends is larger than that at the central part for refracting the light beam.

The third object of the invention is to provide a scanning device, which includes a lamp and an object to be scanned. The lamp is a light tube, and the surface of the light tube facing the object contains a plurality of refractors so as to refract the light beam emitted by the lamp.

The fourth object of the invention is to provide a scanning device, which includes a lamp, an object to be scanned, and a convex plate. The convex plate is disposed over the lamp for reflecting the light beam emitted by the lamp.

The fifth object of the invention is to provide a scanning device, which includes a lamp, an object to be scanned, and a reflector. The reflector is disposed over the lamp, and the surface of the reflector facing the lamp contains a plurality of reflection units to reflect the light beam emitted by the lamp back to the lamp.

DETAILED DESCRIPTION

The invention provides a scanning device for scanning an object, which includes a lamp, an object to be scanned, and a device for changing the optical path of the lamp. The light intensity at the two ends of the object can be intensified through the change of optical path. The invention will be further illustrated by means of the following embodiments.

THE FIRST EMBODIMENT

Figure 1A:
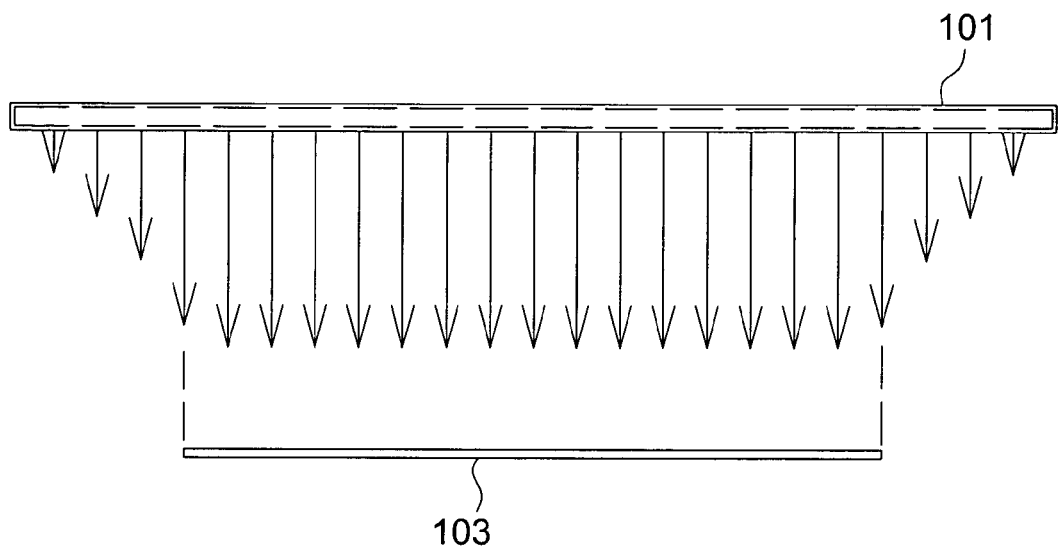
FIG. 1A is a schematic view of a lamp of a conventional scanning device and an object to be scanned, which illustrates insufficient light in the boundary regions at two ends of the light tube.
Figure 1B:
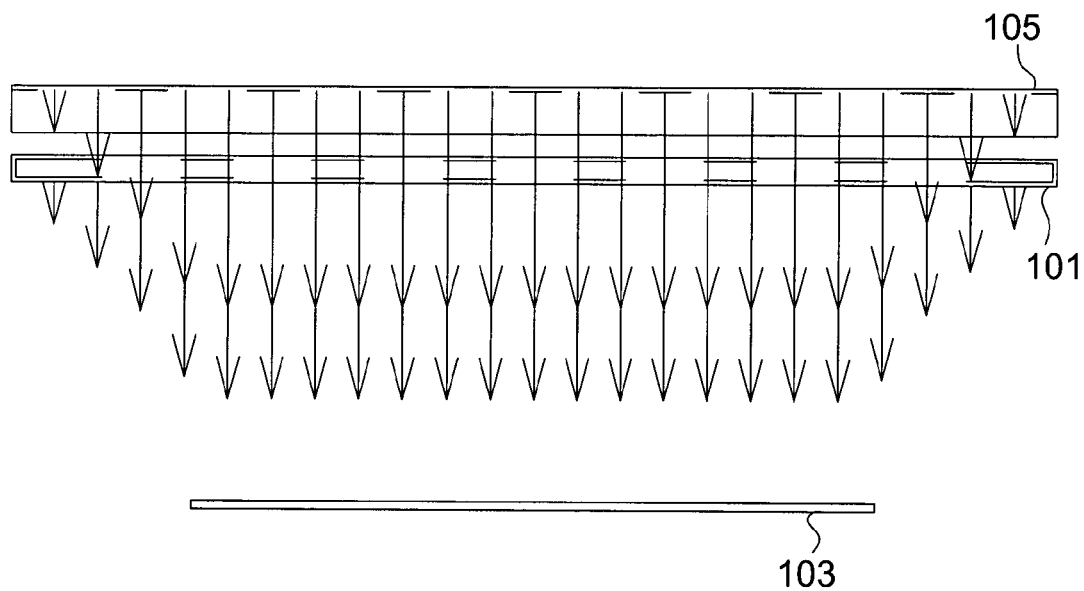
FIG. 1B is a schematic view of a lamp of a conventional scanning device and an object to be scanned, which illustrates the light beam received by the object is from the direct light beam emitted by the light tube and from the reflected light beam emitted by the reflective light tube of the reflective panel.
Figure 1C:
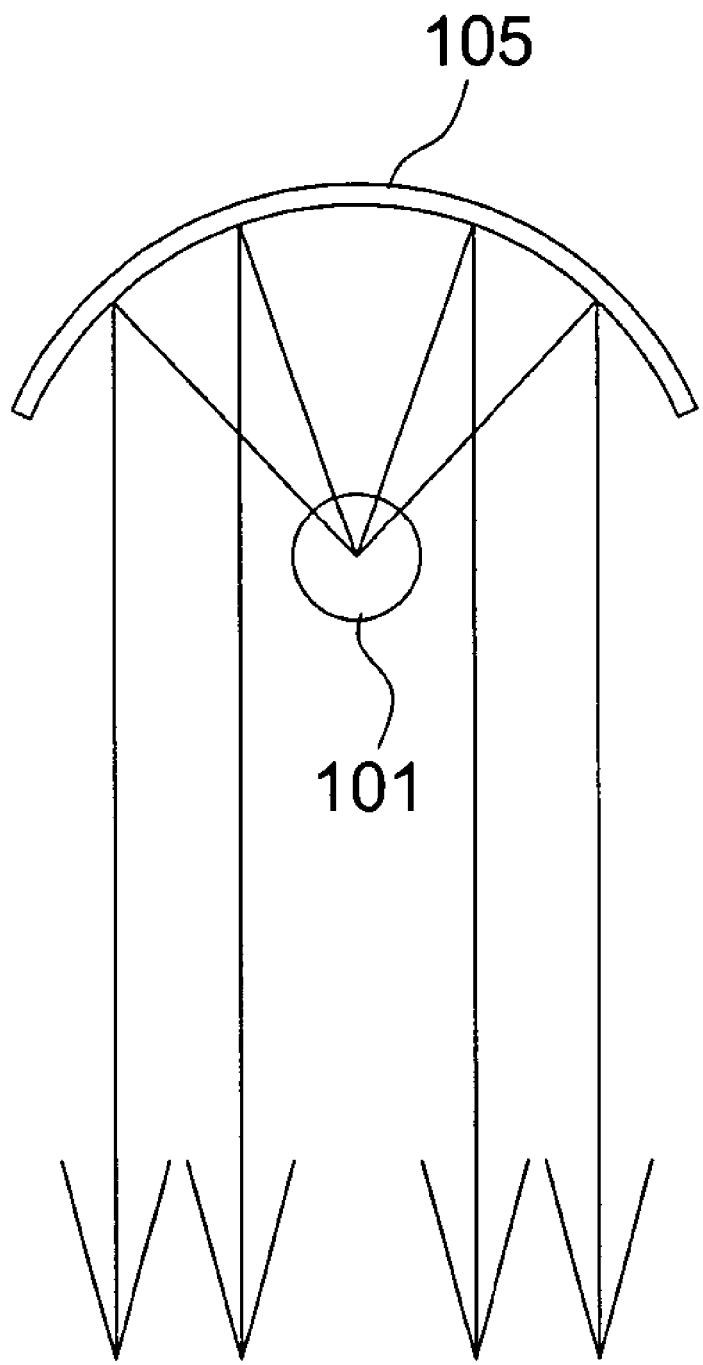
FIG. 1C is a side view of a conventional lamp and a reflector, which illustrates the optical path of the light beam that is firstly emitted by the lamp and then reflected by the reflector.
Figure 2:
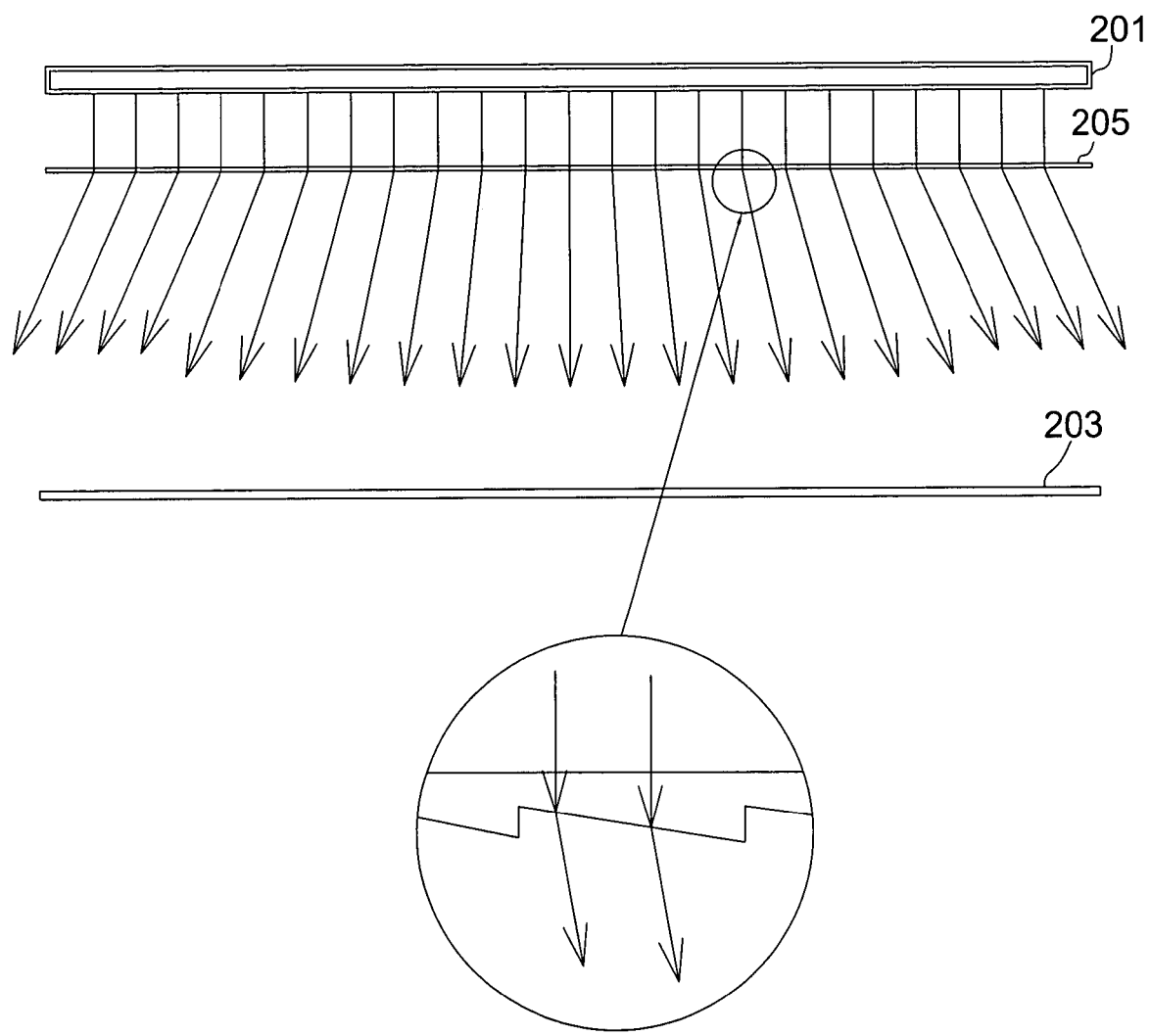
FIG. 2 is a schematic view showing that a transparency is added in between the lamp of the scanning device and the object of the first embodiment, and the surface of the transparency facing the object contains a plurality of refractors for refracting a light beam.

FIG. 2 is a schematic diagram showing the first embodiment of the invention. The invention is a scanning device, including a lamp 201, an object 203 to be scanned, and a transparency 205. The lamp 201 emits a light beam toward the object 203, and the transparency 205 is placed between the lamp 201 and the object 203. The transparency has a first surface and a second surface. The first surface facing the lamp receives the light beam and allows the light beam passing through. The second surface contains a plurality of refractors for refracting the light beam. Thus, the light intensity at two ends of the object can be intensified.

THE SECOND EMBODIMENT

Figure 3:
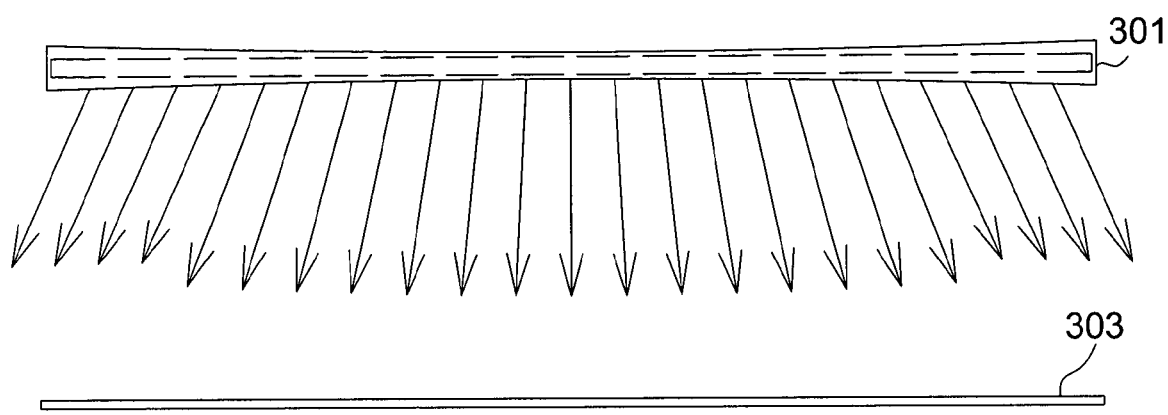
FIG. 3 is a schematic view showing that the lamp of the scanning device of the second embodiment is a light tube of variable thickness, the thickness at two ends is larger than that at the central part.

FIG. 3 is a schematic diagram showing the second embodiment of the invention. The invention is a scanning device, including a lamp 301 and an object 303 to be scanned. The lamp 301 is a light tube of variable thickness. The tube has two ends and a central part, the thickness at two ends is larger than that at the central part for refracting the light beam. Thus, the light intensity at two ends of the object can be intensified.

THE THIRD EMBODIMENT

Figure 4:
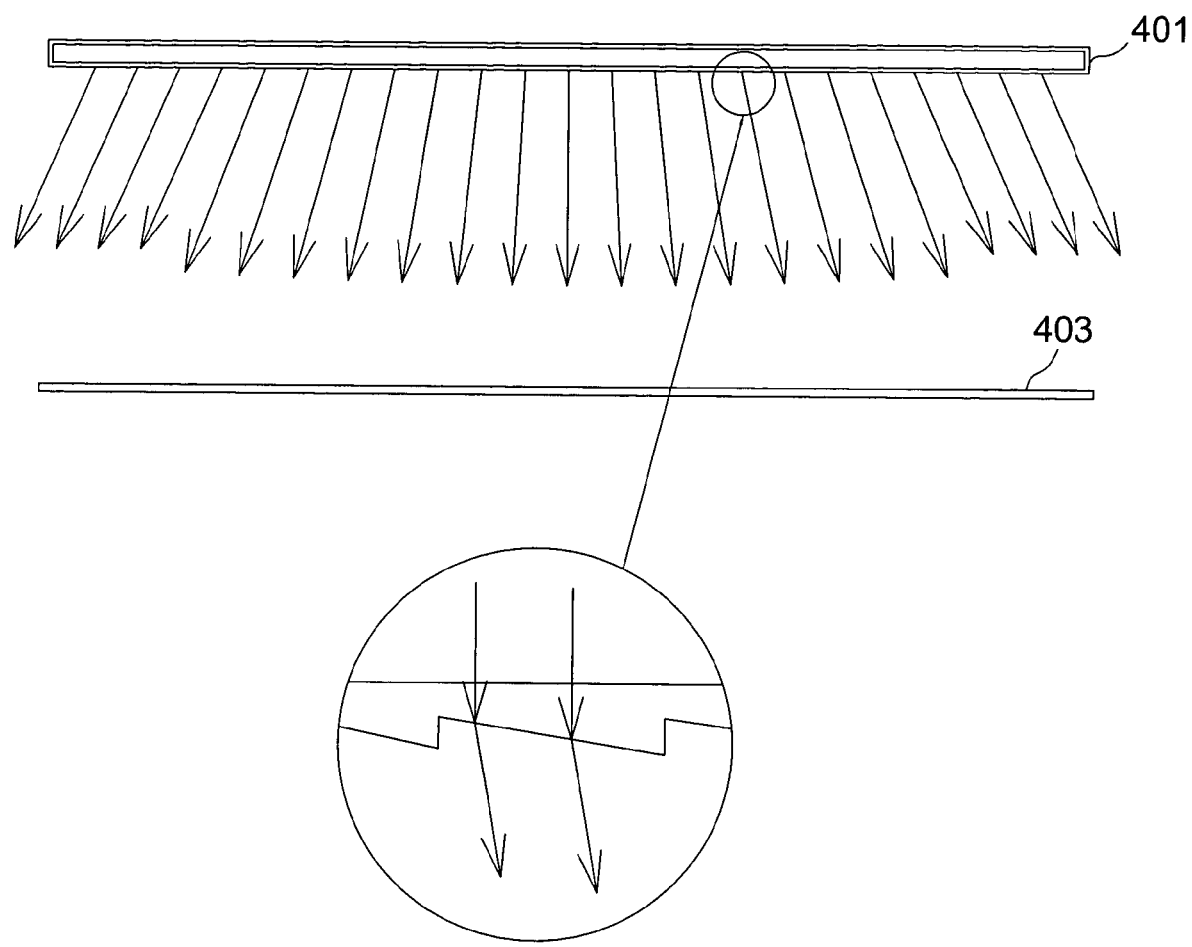
FIG. 4 is a schematic view showing that the lamp of the scanning device in the third embodiment is a light tube, and the surface of the light tube facing the object contains a plurality of refractors for refracting light beams.

FIG. 4 is a schematic diagram showing the third embodiment of the invention. The invention is a scanning device, including a lamp 401 and an object 403 to be scanned. The lamp 401 is a light tube that emits a light beam toward the object 403, and the surface of the light tube facing the object 403 contains a plurality of refractors for refracting the light beam. Thus, the light intensity at two ends of the object can be intensified.

THE FOURTH EMBODIMENT

Figure 5:
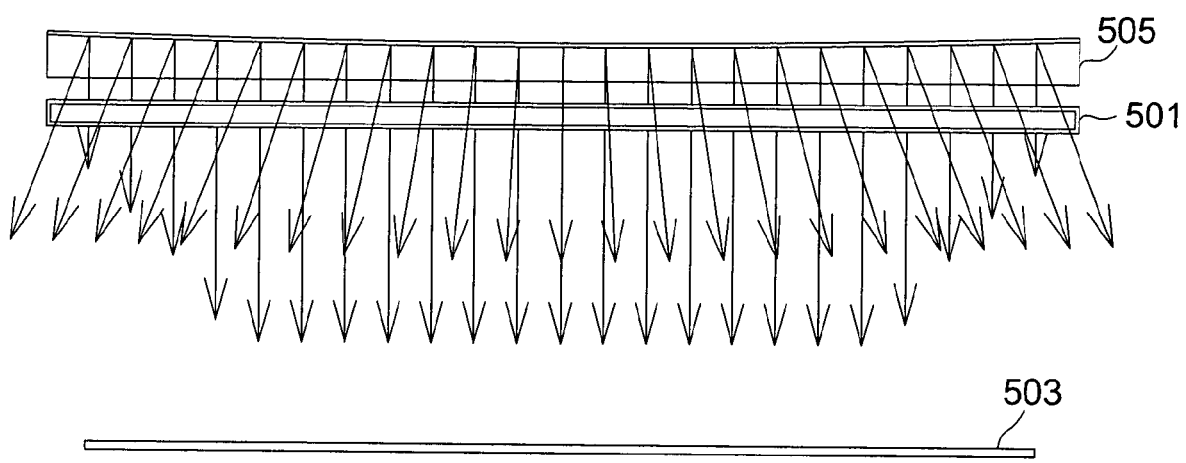
FIG. 5 is a schematic view showing that a convex plate is added in above the lamp of the scanning device of the fourth embodiment for reflecting the light beam.

FIG. 5 is a schematic diagram showing the fourth embodiment of the invention. The invention is a scanning device, including a lamp 501, an object 503 to be scanned, and a convex plate 505. The lamp 501 emits a light beam toward the object 503. The convex plate is located above the lamp 501 to reflect the light beam emitted by the lamp 501. Thus, the light intensity at two ends of the object can be intensified.

THE FIFTH EMBODIMENT

Figure 6:
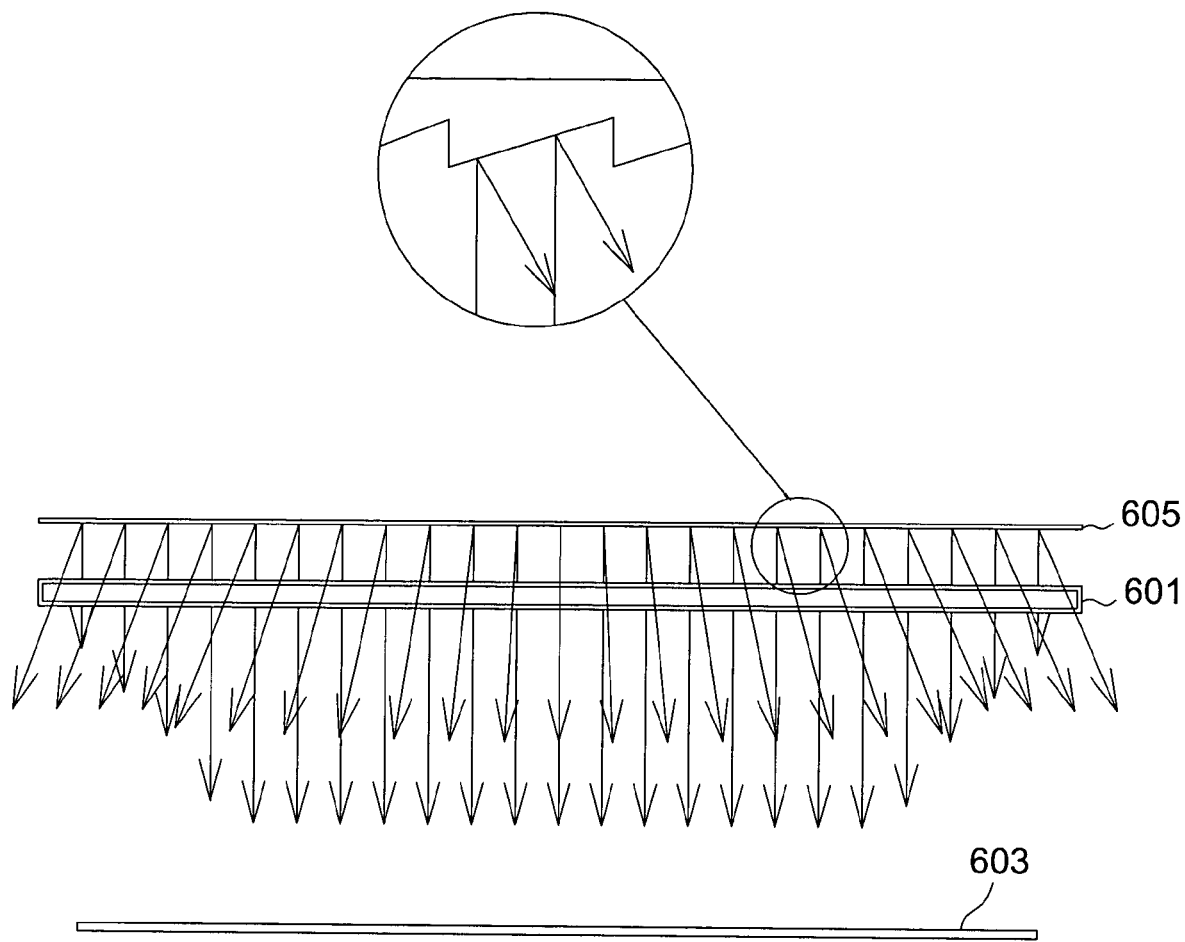
FIG. 6 is a schematic view showing that a reflector is added in above the lamp of the scanning device of the fifth embodiment and the surface of the reflector facing the light beam contains a plurality of reflection units for reflecting the light beam.

FIG. 6 is a schematic diagram showing the fifth embodiment of the invention. The invention is a scanning device, including a lamp 601, an object 603 to be scanned, and a reflector 605. The lamp 601 emits a light beam toward the object 603, and the reflector 605 is located above the lamp 601. The specific feature of the invention is the surface of the reflector 605 facing the lamp 601 contains a plurality of reflection units to reflect light beams emitted by the lamp 601. Thus, the light intensity at two ends of the object can be intensified.

The embodiments above are only intended to illustrate the invention; they do not, however, limit the invention to the specific embodiments. Accordingly, various modifications and changes may be made without departing from the spirit and scope of the invention as described in the appended claims.

The invention claimed is:

1. A scanning device for scanning an object that has two ends, comprising:
   a lamp, which has two ends, for emitting a light beam onto said object, a first line defined by the two ends of the lamp being substantially parallel to a second line defined by the two ends of the object; and
   a tube, surrounding with said lamp, of variable thickness comprising two ends and a central part, thickness at said two ends being larger than thickness at said central part for refracting said light beam,
   wherein said light beam is substantially collimated before passing through said tube, and after said light beam passes through said tube, said tube refracts said light beam to deflect toward the two ends of the object, to facilitate said light beam to dispread substantially equally onto said object.

2. The scanning device of claim 1, wherein said lamp includes a linear light source, and the linear light source emits more light at a central portion of the linear light source than at both of the two ends of the linear light source.

* * * * *